US006813526B1

(12) United States Patent
Dodd, Jr.

(10) Patent No.: US 6,813,526 B1
(45) Date of Patent: Nov. 2, 2004

(54) FLEET MAINTENANCE METHOD

(76) Inventor: William A. Dodd, Jr., 207 Foxfire Ct., Clearwater, FL (US) 34621

( * ) Notice: Subject to any disclaimer, the term of this patent is extended or adjusted under 35 U.S.C. 154(b) by 94 days.

(21) Appl. No.: 10/065,467

(22) Filed: Oct. 22, 2002

Related U.S. Application Data

(63) Continuation-in-part of application No. 09/682,275, filed on Aug. 13, 2001, now Pat. No. 6,505,086.
(60) Provisional application No. 60/319,476, filed on Aug. 16, 2002.

(51) Int. Cl.[7] .............................................. G05B 19/18
(52) U.S. Cl. ............................ 700/65; 700/66; 700/73; 701/24; 701/123; 702/63; 702/187; 290/406
(58) Field of Search .............................. 700/65, 66, 73; 701/22, 23, 24, 117, 123, 213; 702/63, 187; 290/406

(56) References Cited

U.S. PATENT DOCUMENTS

| | | |
|---|---|---|
| 5,053,768 A | 10/1991 | Dix, Jr. |
| 5,095,430 A | 3/1992 | Bonito et al. |
| 5,132,968 A | 7/1992 | Cephus |
| 5,371,487 A | 12/1994 | Hoffman et al. |
| 5,524,081 A | 6/1996 | Paul |
| 5,553,269 A | 9/1996 | Nunes |
| 5,576,972 A | 11/1996 | Harrison |
| 5,610,586 A | 3/1997 | Zeytoonjian et al. |
| 5,673,252 A | 9/1997 | Johnson et al. |
| 5,797,809 A | 8/1998 | Hyuga |
| 5,852,351 A | 12/1998 | Canada et al. |
| 5,907,491 A | 5/1999 | Canada et al. |
| 5,912,644 A * | 6/1999 | Wang ......................... 342/457 |
| 5,930,742 A | 7/1999 | Dodd, Jr. et al. |
| 5,963,679 A | 10/1999 | Setlak |
| 6,112,126 A | 8/2000 | Hales et al. |
| 6,115,654 A | 9/2000 | Eid et al. |
| 6,131,067 A | 10/2000 | Girerd et al. |
| 6,204,772 B1 | 3/2001 | DeMay et al. |
| 6,208,247 B1 | 3/2001 | Agre et al. |
| 6,236,940 B1 * | 5/2001 | Rudow et al. ............... 701/300 |
| 6,305,009 B1 | 10/2001 | Goor |
| 6,326,982 B1 | 12/2001 | Wu et al. |
| 6,348,007 B2 | 2/2002 | Kawasaki et al. |
| 6,359,431 B1 | 3/2002 | Coles |
| 6,470,242 B1 | 10/2002 | Rudow et al. |
| 6,496,141 B2 | 12/2002 | Pippin |
| 2002/0004723 A1 | 1/2002 | Meifu et al. |
| 2002/0016674 A1 * | 2/2002 | Rudow et al. ............... 701/215 |
| 2002/0116140 A1 | 8/2002 | Rider |

FOREIGN PATENT DOCUMENTS

| | | |
|---|---|---|
| EP | 0710494 B1 | 11/2001 |
| WO | WO02005900 A3 | 1/2002 |

OTHER PUBLICATIONS

WO 01/61271 A2, Map Matching Golf Navigation System, Aug. 23, 2001, Coffee, John.*

US 2001/0019420 A1, Sanbongi et al., Sep. 6, 2001, Image Data Processing System.

US 2001/0032025 A1, Lenz et al., Oct. 18, 2001, System and Method for Monitoring and Control of Processes and Machines.

(List continued on next page.)

*Primary Examiner*—Ramesh Patel
(74) *Attorney, Agent, or Firm*—Anton J. Hopen; Smith & Hopen, P.A.

(57) ABSTRACT

Provided is a method for optimizing golf car usage and deployment including the steps of recording golf car usage record based on axle revolutions, associating a golf car identification with the usage record, communicating the usage record and associated identification to a data store, calculating total usage data for each golf car identification and transmitting total usage data to a display device.

30 Claims, 11 Drawing Sheets

OTHER PUBLICATIONS

US 2001/0033567 A1, Frati, Oct. 25, 2001, Device for Providing Services and for Transmission of Data in the Home.

US 2001/0044588 A1, Mault, Nov. 22, 2001, Monitoring System.

US 2001/0049471 A1, Suzuki et al., Dec. 6, 2001, Life Support Apparatus and Method and Method for Providing Advertisement Information.

US 2002/0019584 A1, Schulze et al., Feb. 14, 2002, Wireless Internet Bio–Telemetry Monitoring System and Interface.

US 2002/0035403 A1, Clark et al., Mar. 21, 2002, Method and Apparatus for Remotely Monitoring and Controlling a Pool or Spa.

US 2002/0041240 A1, Ikeda et al., Apr. 11, 2002, Status Notification System, Status Notification Apparatus and Response Apparatus.

US 2002/0059178 A1, Hirabayashi et al., May 16, 2002, Information Management Method, Information Processing Method, Information Processing Apparatus . . .

US 2002/0059030 A1, Otworth et al., May 16, 2002, Method and Apparatus for the Processing of Remotely Collected Electronic Information Characterizing Properties of Biological Entities.

Smith, Clint, Wireless Telecom FAQs 2001 McGraw–Hill, New York.

Baartse, Mark et al., Professional ASP XML, 2000, Wrox Press Ltd., United Kingdom.

Taylor H. Rosemary, Data Acquisition for Sensor Systems, 1997, Chapman & Hall, London.

Bentham, Jeremy, TCP/IP Lean Web Servers for Embedded Systems, 2000, CMP Books, Kansas, United States.

Fifth IEEE TC–9/NIST Workshop on Smart Transducer Interface Standards IEEE P1451, Conference Proceedings Nov. 15–17, 1995, NIST U.S. Department of Commerce.

* cited by examiner

FLEET MAINTENANCE METHOD

PRIORITY DATA

This application is a continuation-in-part of U.S. Pat. application Ser. No. 09/682,275, filed Aug. 13, 2001 now U.S. Pat No. 6,505,086 and claims priority from U.S. Provisional Application Ser. No. 60/319,476 filed Aug. 16, 2002.

BACKGROUND OF INVENTION

Field of Invention

This invention relates to a method of monitoring golf car usage to enhance the efficiency of golf course operations and related equipment.

SUMMARY OF INVENTION

The present invention is a method for optimizing golf car deployment. The fundamental steps include recording golf car usage record based on axle revolutions, associating a golf car identification with the usage record, communicating the usage record and associated identification to a data store; calculating total usage data for each golf car identification and reporting total usage data. Recording the golf car usage data can be achieved by implementing a magnet device to record the deviation in galvanic current upon each rotation. However, photonic, mechanical and sonic detection of the axel rotation are anticipated by the present Invention.

The golf car identification may be proprietary to the particular golf car operation or may be the manufacturer's serial number. The association of the golf car identification with the usage data is preferably achieved by a database table wherein columns and row values represent the usage and golf car identification values. Additional identifying information in the table may include battery information, age of the golf car, maintenance records, warranty data, golf course information and the like.

The usage data for the golf car may be calculated as an aggregate since the golf car was deployed, similar to an odometer. Alternatively, the axle count may be periodically reset to maintain smaller values in the buffer. Usage data is typically stored in an electronic medium during golf car operation and retrieved periodically by wired or wireless means.

In an embodiment of the invention, golf car rental income data is calculated for a predetermined time frame. Golf car usage data for the same time frame is also calculated. The income data and the usage data are then compared whereby discrepancies between actual use and rental records may be resolved. For example, if a golf car typically travels 10,000 yards in a play of 18 holes and usage data indicates the golf car actually traveled 20,000 yards, rental income should reflect sales of two (2) 18 hole rounds under the golf car.

In a preferred embodiment, the preexisting accounting program used to track income In the golf car operation is provided with a software conduit for exporting golf car rental income data to the data store. Alternatively, the software conduit may import golf car usage data from the data store to the accounting program. For example, QUICKBOOKS software manufactured by Intuit Corporation provides a standardized development kit (SDK) for software developers to import and export data from the application. The SDK includes an object-oriented software component that is called from a software process to send and receive data from the QUICKBOOKS master data file. Accordingly, sales data for the golf car operation may be exported to the data store and compared with golf car usage. In this case, a reporting application such as CRYSTAL REPORTS manufactured by Crystal Decisions, Inc. in Palo Alto, Calif. may be deployed to generate reports from the data store to compare sales data with usage data. Alternatively, usage data from the data store may be imported to the QUICKBOOKS master data file and reports may be run within the QUICKBOOKS application to compare usage data and sales data.

An operation that has a high Income to usage value suggests an efficient, profitable operation. Accordingly, an embodiment of the invention includes the steps of calculating a usage-income efficiency value based on the step of comparing rental income data with usage data. Additionally, personal responsibility for the success or failure of the operation may be borne by identifying at least one or more employees responsible for collecting golf car rental income and grouping the usage-income efficiency value with the at least one or more employees. On a larger scale, the relative profitability of a plurality of golf course operation may be determined by measuring the usage-income efficiency value of a first golf course operation against a second golf course operation.

With a group of like-equipment, i.e., similar in make, type, model and age, (a "group") it is in the group operator's economic interest to: (1) minimize equipment downtime, (2) minimize equipment repair expense, (3) extend the group useful life, and (4) if the equipment is used for revenue production, minimize revenue loss due to equipment downtime.

In addition, it is in the OEM's economic interest to encourage its customers, the equipment operators, to balance usage of groups of the OEM's equipment and thereby to: (1) ensure operator satisfaction with the equipment by minimizing equipment downtime and (2) minimize equipment warranty claims by the operator. The present invention, using collected golf car usage data, enables the operator to accomplish all of these objectives. On a periodic basis (hourly, daily, weekly, etc.), the method tabulates for every group being monitored by the invention a table of accumulated usage data for each equipment unit in the group. With every tabulation, every unit in the group is assigned to a usage percentile. On a periodic basis, the on-board memory device on each equipment unit is updated by the invention with its usage percentile ranking ("UPR") and this UPR is displayed on a color-coded or display type LED mounted on each equipment unit. The operator balances group rotation by using each equipment unit based on the unit's UPR: frequent and repeated usage for units with low UPRs, minimum or no usage for units with high UPRs. The invention provides the operator and the OEM with periodic text and graphic notices identifying any equipment units that are deviating from the group's usage average. Unit's UPRs are constantly re-tabulated and unit usage is continuously adjusted so that throughout the group's useful life, every unit In the group has approximately the same usage as every other unit.

An embodiment of the present invention collects golf car usage data from on-board sensor devices on a group of equipment units, passes the data by various communications means to a database store, processes the golf car usage data from the group, prepares equipment rotation reports, and transmits the reports by various communications means to the equipment operator, such reports designed to enable the operator to balance the usage of the equipment units in the group and, in turn, to minimize equipment downtime, minimize equipment repair expense, extend the group useful life, and if the equipment is used for revenue production, minimize revenue loss due to equipment downtime.

in addition to the economic benefits enumerated above which result from balanced usage of the equipment, the equipment owner realizes a higher residual value for the units upon disposal. If the equipment is leased to the operator, these benefits accrue to the OEM; if purchased, they accrue to the operator.

The method includes the steps of prioritizing the deployment of golf cars based on total usage data and communicating a priority order by a visual Indicator. The visual indicator may be one or more light emitting diodes, a liquid crystal display (LCD) or the like. Preferably, if an LCD is used, it displays the deployment priority numerically or alphabetically. In addition, the LCD provides battery capacity level. As some modern golf cars are equipped with global positioning devices, an embodiment of the invention may utilizing these preexisting displays to provide the deployment priority by alphanumeric indicator.

There are economic benefits for an operator if he is able to compare his equipment usage levels for specified time periods (days, weeks, months) with usage levels of groups of other operators (i.e., groups by type, by size, and by geographic region). Based on an operator's percentile ranking within the various groups, the operator can determine, for example, if marketing and advertising expenditures are appropriate. If an operator's usage ranking percentile ("URP") is low compared to other operators of his type within his geographic region, such marketing and promotional spending may be productive, whereas if the operator's URP is high, additional marketing and advertising expenses may not be worthwhile. In addition, the URP is a gauge of how efficient or productive his operation compares to other operators in the various groups.

The invention, using collected golf car usage data, generates comparative equipment usage reports (by day, week and month) for groups of other operators whose equipment is monitored by the invention, and makes such usage data available on-call to the operator in text and graphic form. Note that, for confidentiality purposes, an operator sees his usage data only compared to group index; i.e., the operator sees his URP within each of the various groups. The operator does not see specific usage data for any other individual operator within any group.

An operator can derive valuable economic benefits from knowing precisely how his equipment usage ranks in comparison to usage of various groups of other like-operators. The operator can raise URP within the groups by: (1) optimizing marketing and advertising programs, (2) scheduling additional shifts for more productivity, and (3) implementing maintenance programs to gain efficiency.

In an embodiment of the Invention, total usage data is grouped into operational units and a benchmark value is calculated across a plurality of operational units. The usage data of an individual operational unit is then compared with the benchmark value to quantify the relative success of the individual operational unit. Responsive to the comparison, modification may be made in marketing programs, personnel scheduling and maintenance programs. To encourage participation of a plurality of operational units without concern that competitive data might be disseminated, it is preferred that the identity of the other operational units under comparison be keep confidential.

There are economic benefits that accrue to a battery OEM ("BOEM") if the BOEM is able to monitor and track battery voltage data for large quantities of batteries performing in "live" field applications. The BOEM can: (1) monitor the real operating environment in which its product is performing, (2) observe circumstances that cause product failure, (3) develop product improvements using large scale field data versus limited laboratory-test data, (4) document product failures, and (5) verify product warranty claims.

In addition, there are economic benefits that accrue to the operator of battery-powered equipment if the operator is able to monitor "exception" battery voltage data for batteries on his equipment. Low battery voltage information assists the operator in identifying failing batteries and changing such batteries before they cause equipment downtime or poor performance, resulting in loss of rental income, and/or operational inefficiencies, and/or poor equipment productivity.

The invention, using collected voltage data, generates battery performance reports (i.e., periodic voltage readings) and makes such voltage data available on-call to the BOEM and to the equipment operator in text and graphic form. The BOEM derives the economic benefits described above by knowing precisely the patterns of voltage changes as the batteries are used in live field applications. The equipment operator derives the economic benefits described above by knowing precisely how the voltage of batteries in his equipment decline below threshold levels.

The invention: (1) collects periodic voltage data (typically hourly) from on-board sensor devices on equipment units, (2) passes the data by various communications means to a database store, processes the voltage data, prepares battery performance reports, (3) transmits such reports by various communications means to the BOEM and to the equipment operator, such reports designed to enable the BOEM to monitor the real operating environment in which its product is performing, observe circumstances that cause product failure, develop product improvements using large scale field data versus limited laboratory-test data, document product failures, and verify product warranty claims; such reports also enable the operator to identify failing batteries and change such batteries before they cause equipment downtime or poor performance, and resulting loss of rental income, and/or operational inefficiencies, and/or poor productivity.

Therefore, an embodiment of the invention includes the steps of collecting golf car battery level data concurrently with usage data, correlating battery level data and usage data and evaluating battery performance based on usage data. The product warranty data may be associated with battery performance to verify product warrant claims. Similarly, battery replacement may be schedule responsive to poor battery performance. The battery performance as measured by the invention may be transmitted to entities interested in the data, including, but not limited to, original battery manufacturers, fleet owners, and fleet maintenance personnel.

There are economic benefits for operators if they are able to forecast hourly, daily, weekly and monthly demand for use of their equipment so they can plan: (1) equipment maintenance and facilities maintenance if equipment use is forecast to be low, (2) use of underutilized units of equipment if demand is forecast to be low, and (3) scheduling of extra staff for support activities if equipment use is forecast to be high. For example, a golf course operator would like to know which days of the week demand for golf cars will be low so he can plan golf car and golf course maintenance on those days. On days and hours when demand is forecasted to be high, the operator needs to schedule extra sales and service staff and less maintenance staff.

The invention, using historical golf car usage data, generates equipment-demand forecasts by hour, day, week and month by tracking the actual usage for similar prior periods and making such usage data available on-call to the operator in text and graphic form. Operators can derive valuable economic benefits from knowing precisely historical equipment usage patterns. The operator can: (1) optimize staffing schedules and thereby minimize payroll costs, (2) schedule maintenance on equipment and maintenance on support facilities when equipment downtime will have the least effect on rental income or other productive uses of the equipment.

The invention: (1) collects golf car usage data from on-board sensor devices on a group of equipment units, (2) passes the data by various communications means to a database invention, such database invention stores and processes the golf car usage data from the group and prepares equipment-demand forecasts by hour, day, week and month, and (3) transmits such reports by various communications means to the equipment operator, such reports designed to enable the operator to forecast equipment demand patterns and thereby optimize staffing schedules and minimize payroll costs, and schedule maintenance on equipment and maintenance on support facilities when equipment downtime will have the least effect on rental income or other productive uses of the equipment. For example, greens keeping activities may be scheduled at times least likely to interfere with normal course play.

Therefore, an embodiment of the invention includes the steps of scheduling golf course maintenance based on usage data and optimizing staffing schedules coincident with the scheduled maintenance procedures and scheduling maintenance during low equipment demand periods.

There are economic benefits that accrue to the OEM, the insurer, and the lender (if applicable) if the OEM is able to use the invention to count new and used equipment inventory more accurately and more frequently. The OEM can: (1) eliminate the labor cost of physically counting the equipment inventory, (2) improve accuracy of the counts by eliminating human error, (3) increase the frequency of the counts, (4) detect and report deviation from expected counts (and thereby reduce inventory loss by early detection of missing equipment), and (5) readily make the count and deviation data available to the central accounting departments of the OEM, the insurer and the lender (if applicable).

The invention, on demand, remotely counts equipment located at an OEM equipment Inventory site, collects the equipment ID number for every unit at the site, generates inventory reports (i.e., the counts and ID's of equipment units at the site), and then makes the inventory data available on-call to the OEM, the insurer, and the lender in text and graphic form. The OEM, derives the economic benefits as described above, and precisely verifies the physical location of Its equipment. The Insurer and the lender verify the physical location of the equipment Inventory that they are insuring and/or financing.

The invention (1) periodically (daily, weekly, monthly or the like) collects equipment ID data from on-board sensor devices on equipment units stored at OEM sites, (2) passes the data by various communications means to a database invention, such database invention stores and processes the ID data and prepares inventory reports and (3) transmits such inventory reports by various communications means to the OEM, to the insurer and to the lender, such inventory counting process and such inventory reports designed to enable the OEM to eliminate the labor cost of physically counting the equipment inventory, to Improve accuracy of the counts, to Increase the frequency of the counts, to detect and report deviation from expected counts (and thereby reduce inventory loss by early detection of missing equipment), and to readily make the count and deviation data available to the central accounting departments of the OEM, the insurer and the lender.

Accordingly, an embodiment of the invention includes the steps of confirming golf car inventory based on the golf car identification, establishing a predetermined inventory value and reporting a deviation of the value in the confirmation step. The confirmation may be reported to those having a security interest in the golf cars including, but not limited to, OEMs, insurers and lenders.

BRIEF DESCRIPTION OF DRAWINGS

For a fuller understanding of the nature and objects of the invention, reference should be made to the following detailed description, taken in connection with the accompanying drawings, in which.

DETAILED DESCRIPTION

Figure 1:
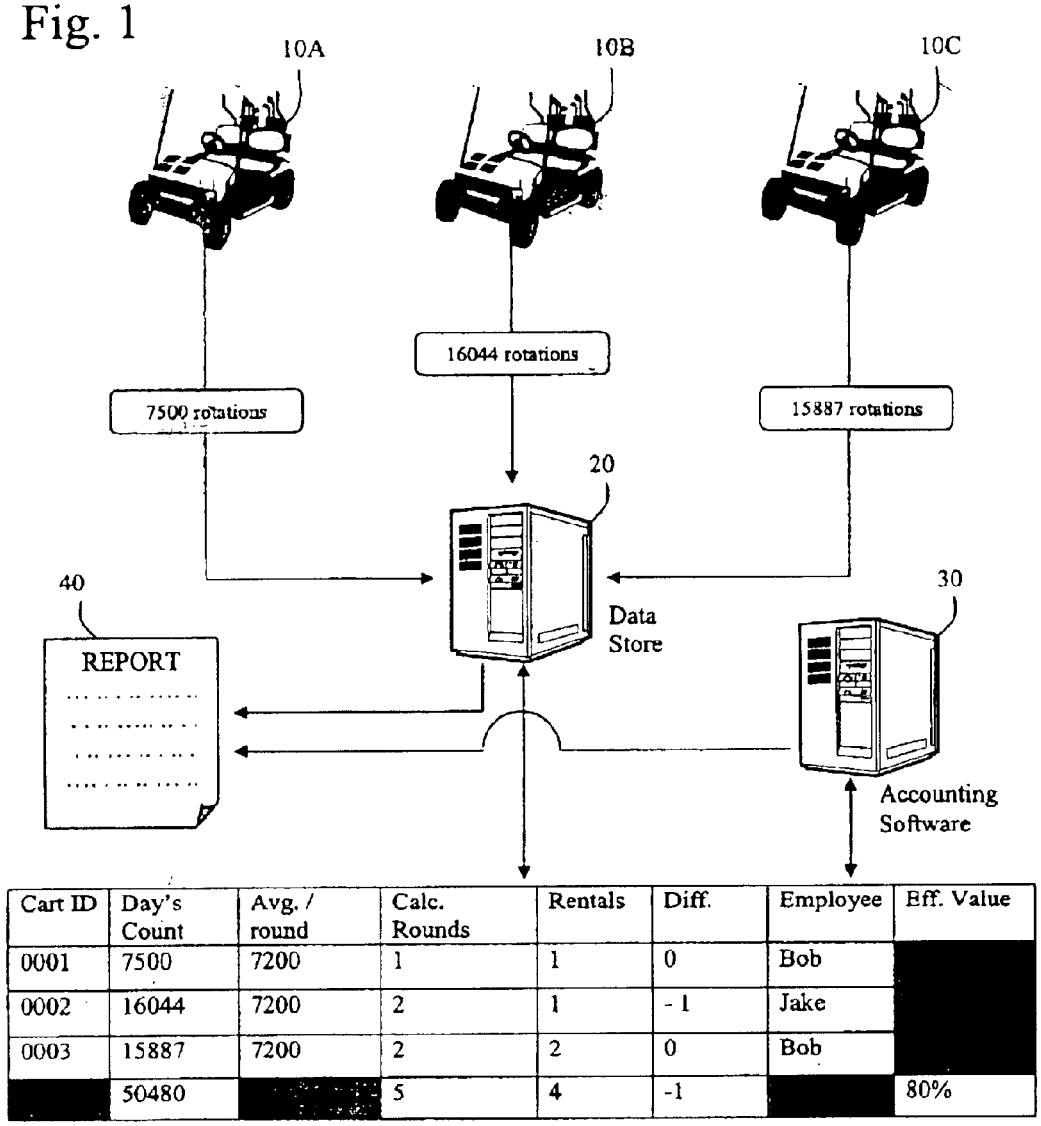
FIG. 1 is a diagrammatic view of an embodiment of the invention that reports golf car usage in view of rental income data.

In FIG. 1, golf cars 10A, 10B and 10C are communicatively linked to data store 20. The data transmitted between the golf cars 10A–C and data store 20 comprises axle rotations representative of the distance traveled by the golf car. Methods and apparatus to measure the axle rotations are provided in U.S. Pat. No. 5,930,742 entitled "Wheeled fleet information processing and reporting system including hubmeter" which is incorporated herein by reference.

Figure 2:
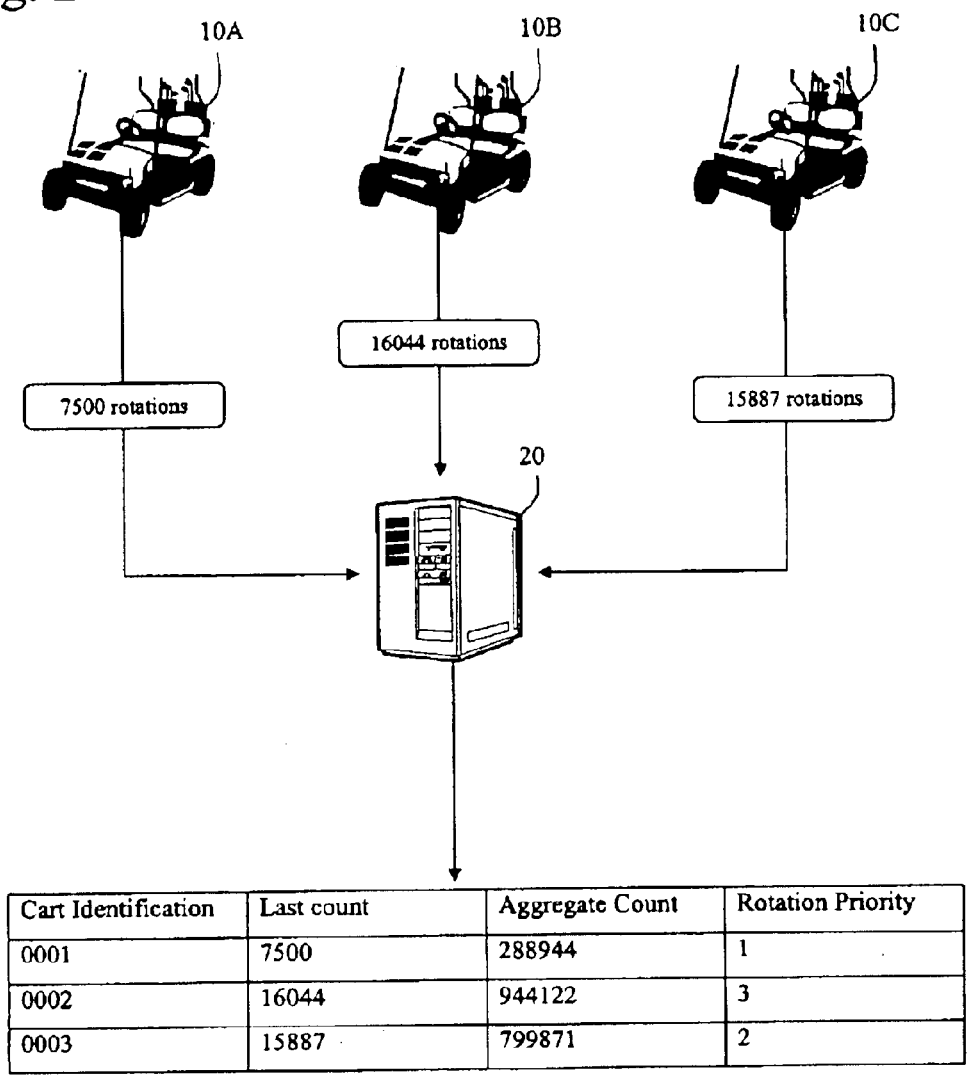
FIG. 2 is a diagrammatic view of an embodiment of the invention that calculates rotation priority based on aggregate golf car usage.
Figure 3:
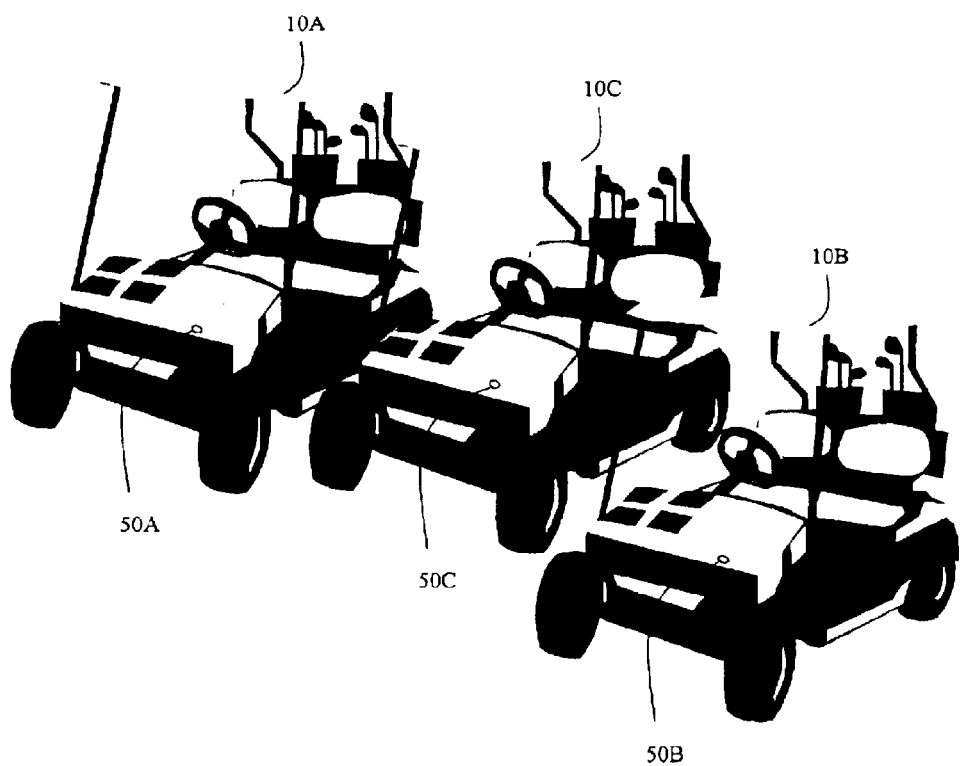
FIG. 3 is an illustration of an embodiment of the invention that displays deployment priority by light emitting diode affixed to a golf car.
Figure 4:
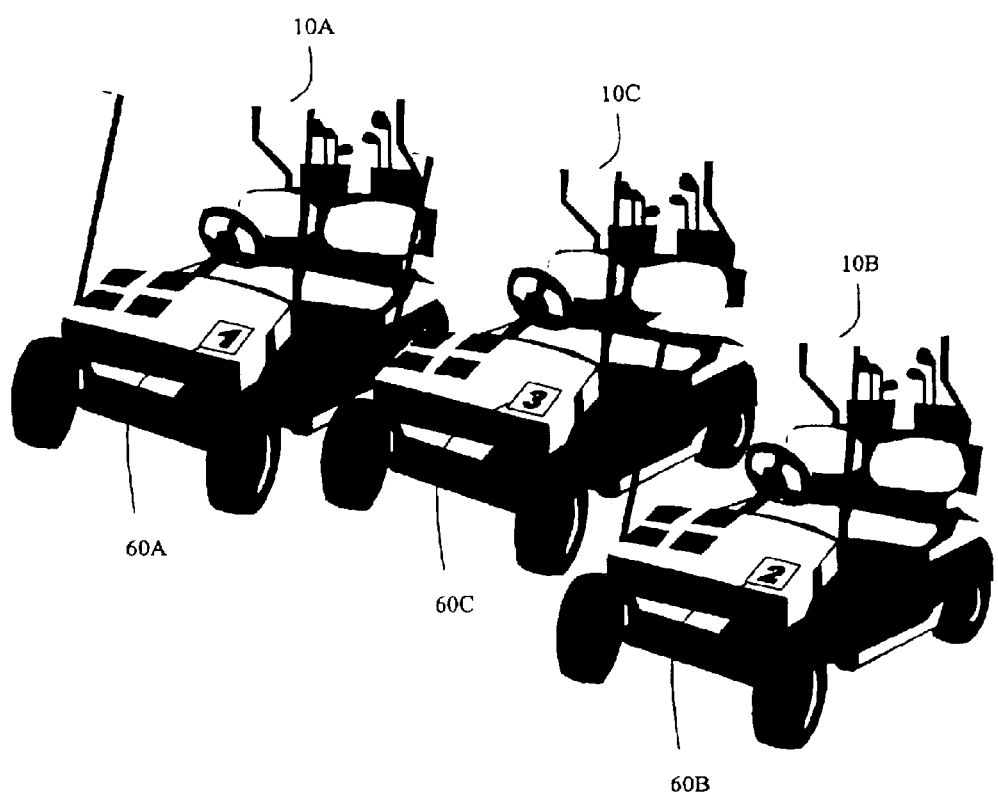
FIG. 4 is an illustration of an embodiment of the invention that displays deployment priority by liquid crystal display affixed to a golf car showing numeric order.
Figure 5:
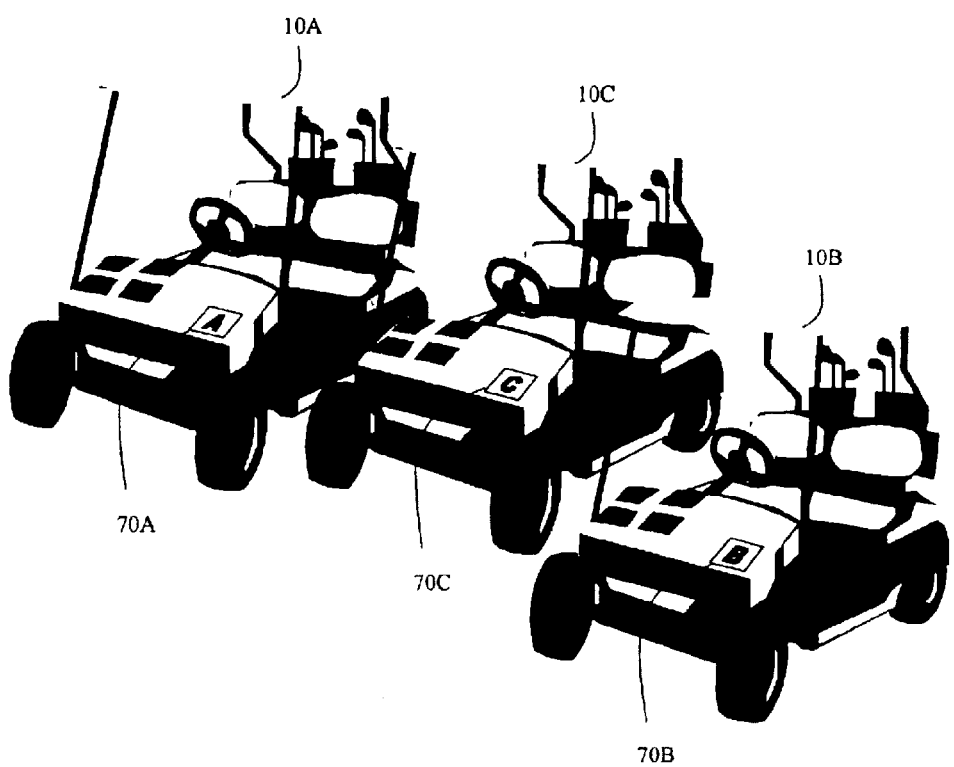
FIG. 5 is an illustration of an embodiment of the invention that displays deployment priority by liquid crystal display affixed to a golf car showing alphabetic order.
Figure 6:
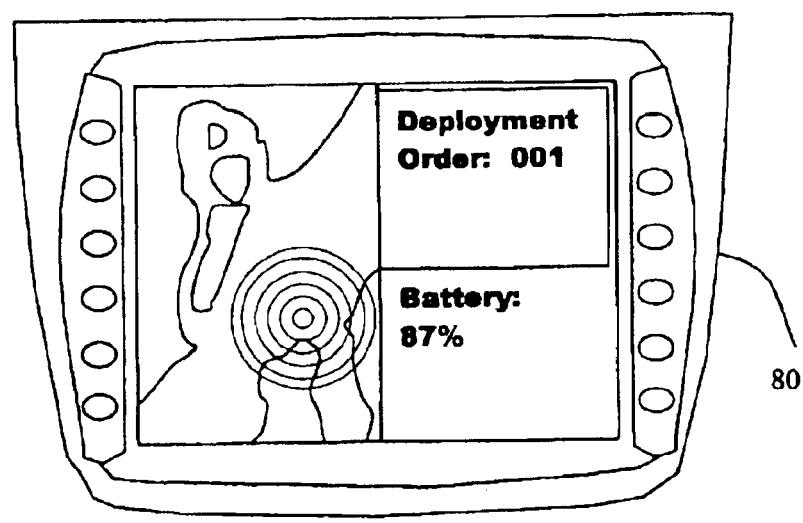
FIG. 6 is a detailed illustration of an embodiment of the invention that displays deployment priority by a liquid crystal display which also displays global positioning satellite data and battery levels.
Figure 7:
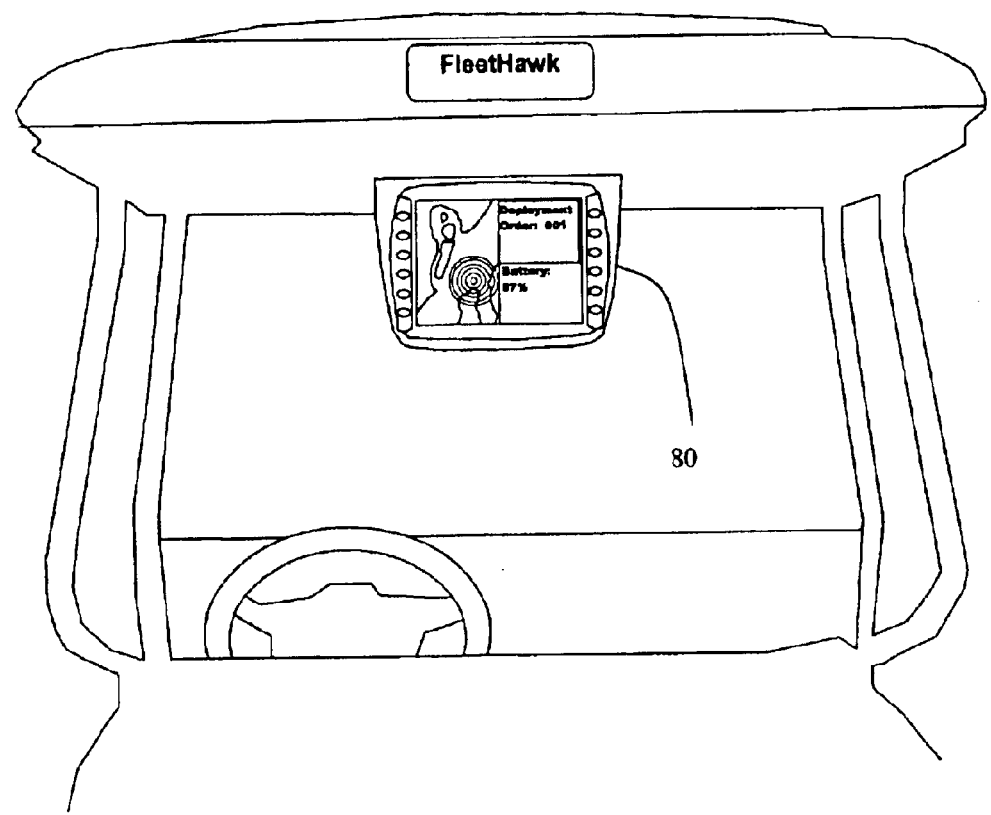
FIG. 7 is an illustration of an embodiment of the invention that displays deployment priority by a liquid crystal display affixed to a golf car roof which also displays global positioning satellite data and battery levels.

The link between the golf cars 10A–C and the data store may comprise manual readings, hardwire, radio frequency or infrared transmissions. In a preferred embodiment, wireless communications are performed by IEEE standard 802.11a, although 802.11b or 802.15 (BlueTooth) may also be utilized, but with less range or speed. As an example, cart 10A indicated 7500 rotations, cart 10B 16044 rotations and cart 10C 15887 rotations. Every rotation of a golf car wheel is approximately 1.5 yards (golf car tire radius is 8.5 inches). A typical distance that a golf car travels on a course is 10,800 yards. Accordingly, a rule of thumb is that one can approximate the distance that a golf car will travel on a course by taking the score-card yardage of the course and multiply by it 1.5. In this particular example, a rotation count for an 18 round game averages 7200 rotations. Dividing the day's count by expected rotations is used to validate the actual usage of the golf car. Accounting software 30 is communicatively coupled to data store 20 to validate that rental income received correlates with the actual use of the golf car. Employees responsible for the rental income can be noted in data store or in accounting software 30. An operations-wide efficiency value can be calculated (in the example it is 80%) to reflect the income-to-usage balance and reported 40. Fleet rotation is illustrated in FIG. 2 wherein usage data from carts 10A–C are aggregated in data store 20 and rotation priority is resolved to even out use of the golf cars over time. Prioritizing the actual deployment of the golf cars may be achieved in a number of ways. In one embodiment, a report may be printed listing the golf cars and the order in which they should be deployed. Alternatively, coded notations may be affixed to the golf car to indicate which golf cars should be deployed first. For example, a green slip placed on a number of cars indicate they have low total usage and should be deployed first. Yellow slips indicate moderate usage and red slipped cars should only be deployed as a last resort. Alternatively, FIG. 3 illustrates an embodiment of the invention wherein the priority of the deployment is indicated electronically on the car itself in the form of a light emitting diode 50A–C. The diodes may simply light, blink or change color in various iterations to indicate deployment priority. For example, rapidly blinking LEDs indicate a high priority for deployment wherein constant-on LEDs indicate a low priority for deployment. In an alternative embodiment shown in FIG. 4, liquid crystal displays (LCDs) 60A–C numerically indicate the priority for deployment. This has the advantage of high deployment accuracy since the golf cars can be deployed in exact accordance with their total usage data. In a variation shown in FIG. 5, alphabetic characters are used to indicate deployment. Another advantage of using LCDs is that other information may be presented such as starting holes for shotgun starts. As golfing technology becomes more pervasive, some golf cars may already have existing LCD screens installed such as those found in GPS-enabled systems. In FIG. 6, deployment order and battery levels are displayed on a GPS-enabled display 80. The advantage of utilizing the existing display is cost savings on manufacture and installation. FIG. 7 illustrates the GPS-enabled display 80 mounted to the roof of a golf car which permits golf course staff to easily check deployment order and battery levels.

Figure 8:
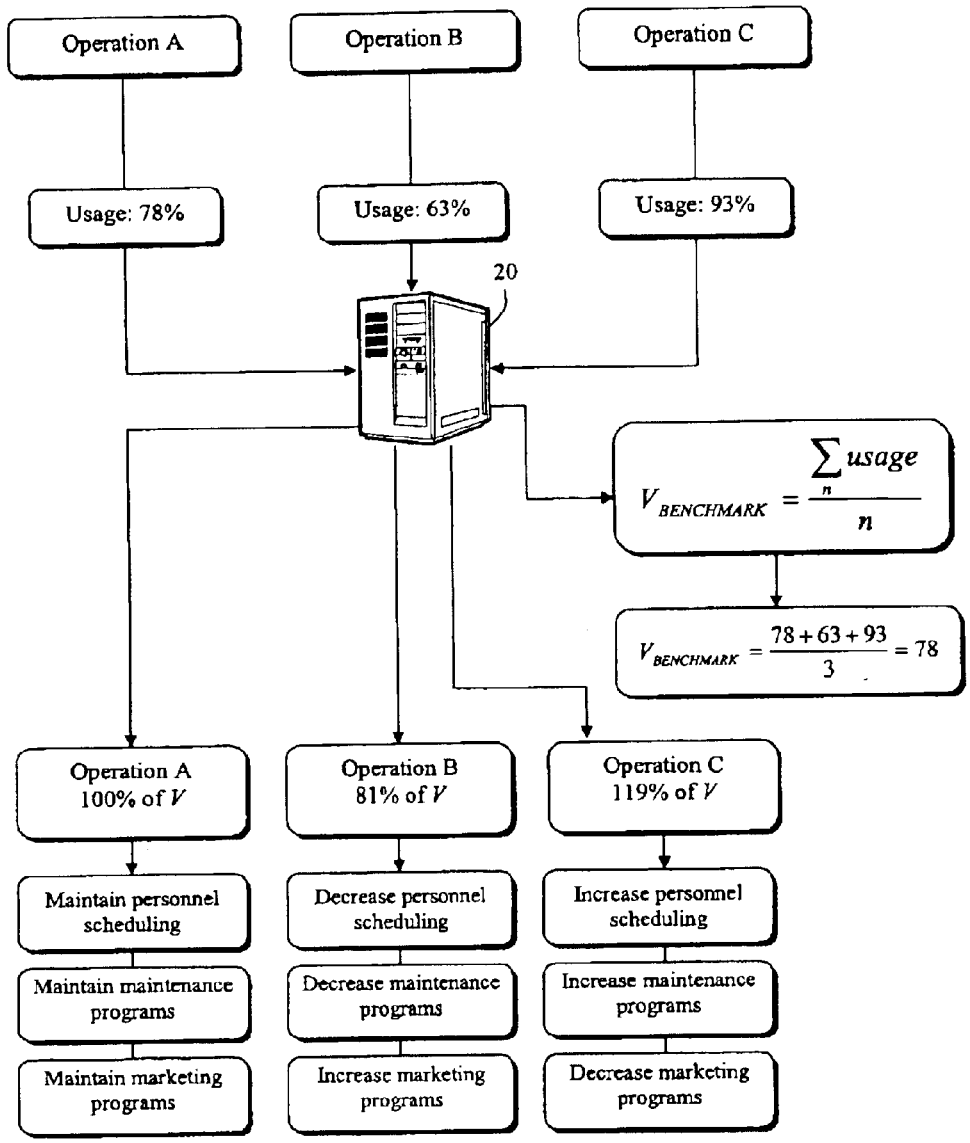
FIG. 8 is a diagrammatic view of an embodiment of the invention that calculates the performance of an operation based on a benchmark value derived from a plurality of operations.

It is generally preferred that income-producing assets be utilized to the maximum extend possible. This is one reason airlines attempt to keep their expensive airliners in service on a nearly continuous basis. Golf course operations vary in success due to many variables including marketing, personnel staff and availability of golf cars to meet demand. It is highly valuable for a golf course operation to empirically measure its performance relative to other golf course operations. However, due to the competitive nature of the business, golf courses are not likely to share proprietary business information with each other. An embodiment of the invention that overcomes this problem is illustrated in FIG. 8 wherein Operations A–C report golf car usages of 78, 63 and 93 percent respectively. The usage data is stored in data store 20. A benchmark is calculated by taking the sum of usage values from Operations A–C and dividing the total by the number of operations (in this case three). Each operation can then measure its performance against the benchmark value. In the example, Operation A is operating at 100% of the benchmark, Operation B is operating at 81% of the benchmark and Operation C is operating at 119% of the benchmark. While Operation B is poorly performing, Operation C can confirm its usage performance is good. Provided the statistical pool is sufficient, the benchmark does not disclose the relative performance of competing operations. Management and staff responsible for high usage performance, and thus profitability, can be rewarded with bonuses in view of Its rating against the benchmark. Poor usage values in view of the benchmark suggest changes may be needed to increase efficiency and marketing efforts.

Figure 9:
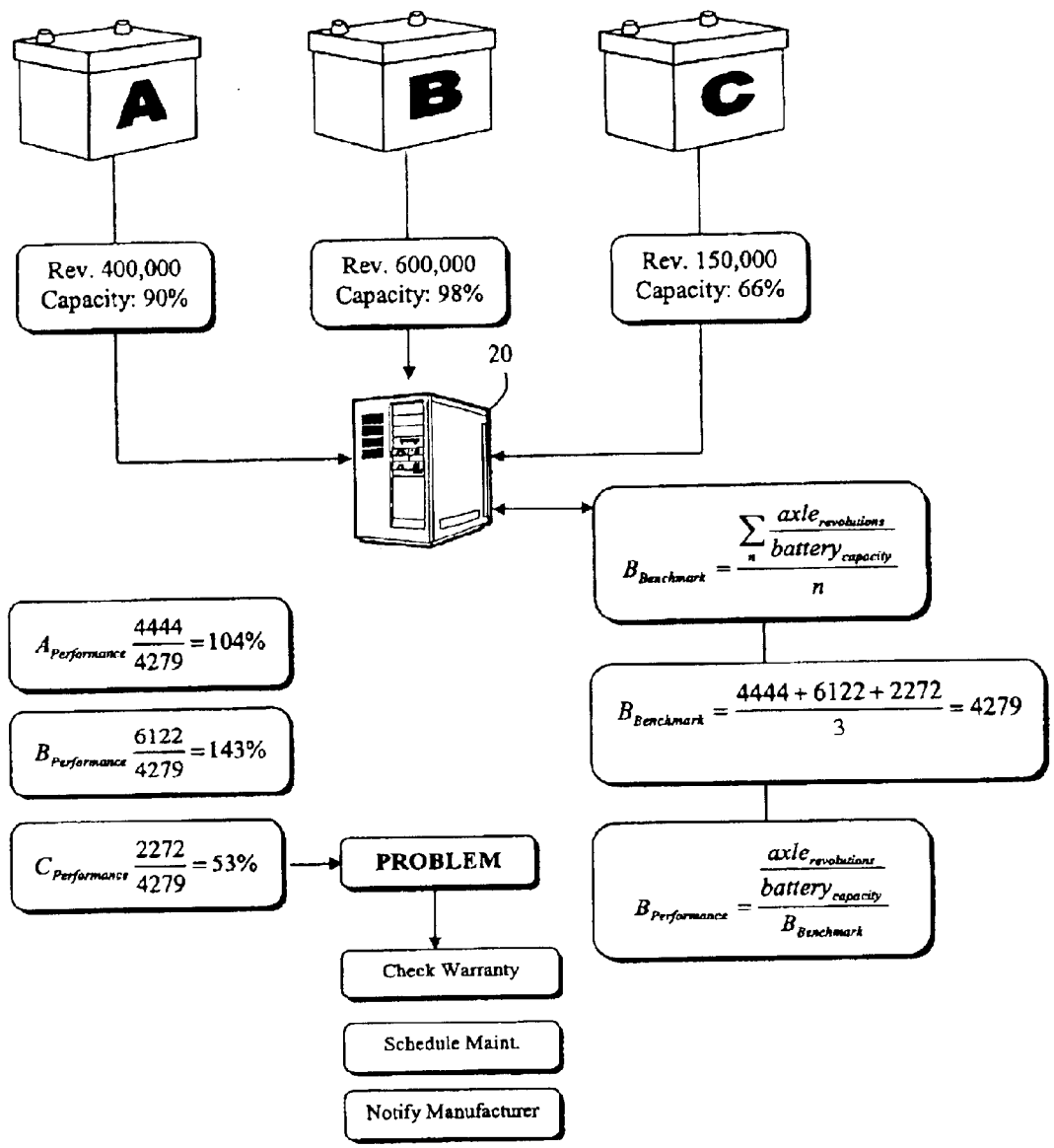
FIG. 9 is a diagrammatic view of an embodiment of the invention that calculates battery performance relative to actual usage.

Although many golf cars utilize combustion engines, battery propelled golf cars are quiet, non-polluting and highly preferred by many courses. In addition, batteries that drive the car are relatively expensive and subject to a wide range of performance characteristics. In FIG. 9, capacity for batteries A–C is reported to data store 20 in view of actual usage data. Battery A has a 90% capacity with an aggregate use of 400,000 turns. Battery B has a 98% capacity with an aggregate use of 600,000 turns. Finally, Battery C has a 66% capacity with an aggregate use of only 150,000 turns. A battery benchmark is calculated by taking the sum of axle revolutions divided by battery capacity and dividing this sum by the population count. A battery performance value is then calculated by dividing the quotient of axle revolutions and battery capacity by the battery benchmark. As shown in FIG. 9, Battery C's battery performance value is 53% which would indicate a problem with the battery in view of its low use. In a preferred embodiment of the invention, warranty data and scheduled maintenance data is accessible by the data store 20 wherein warranty claims for defective batteries may be automated. In addition, battery manufacturers can be notified of unexpected problems, trends in batter life and the like by communicatively linking them with data store 20.

Figure 10:
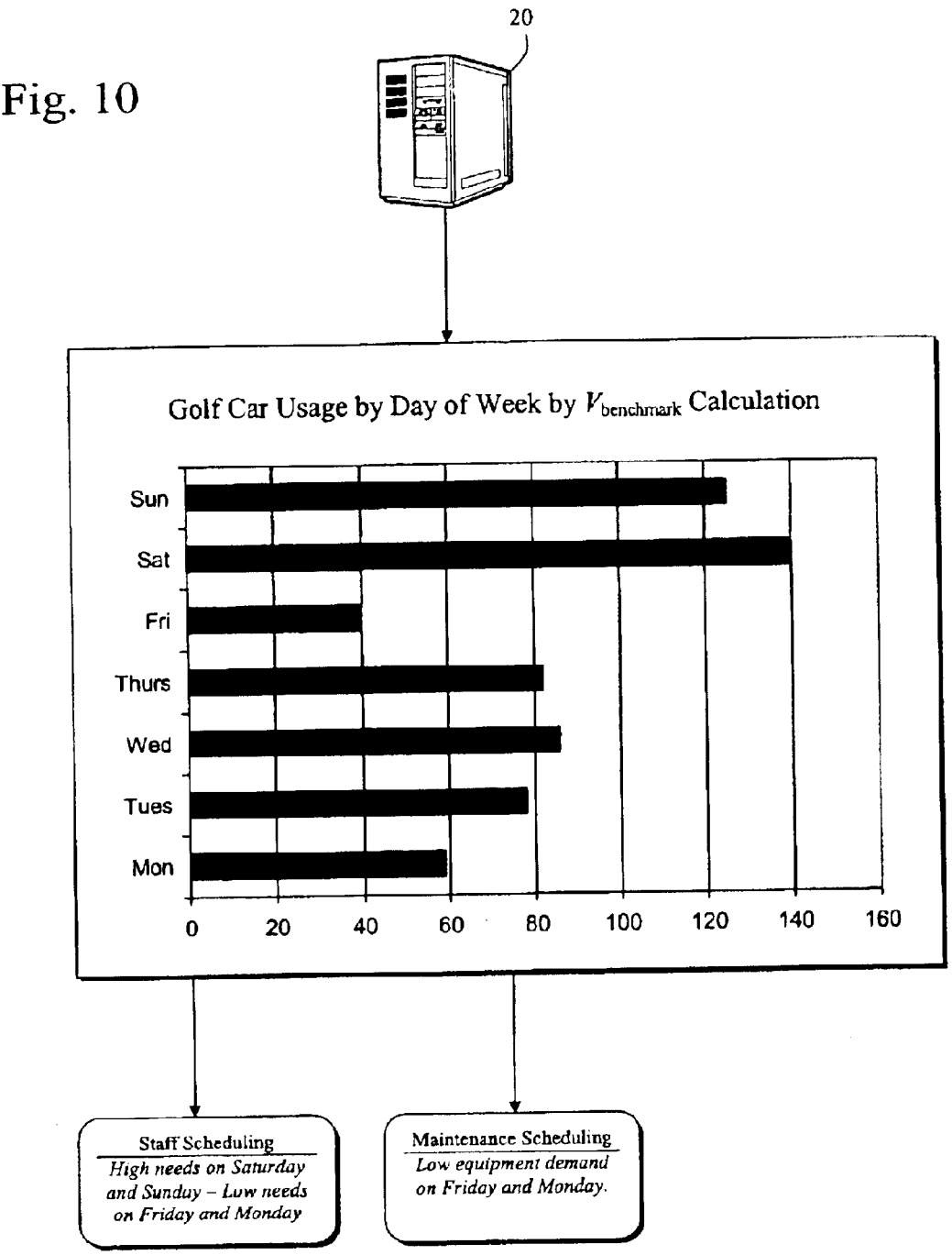
FIG. 10 is a diagrammatic view of an embodiment of the invention that forecasts staffing and maintenance schedules responsive to actual usage data.

Another problem in the art exist in golf car operations relating to the variability of golf car usage during identifiable time periods. The periods may be seasonal, monthly, weekly, daily, or related to extraneous events such as holidays, major sporting events (such as the Superbowl), and the like. In FIG. 10, data store 20 reports golf car usage by the day of the week. As shown, Saturday and Sunday are the most popular days for use while Friday is the least popular day. Responsive to this report, staff scheduling may be automatically performed to ensure adequate staff in busy periods and to avid over-staffing during inactive periods. In addition, golf course and golf car maintenance scheduling can be avoided during busy periods when the golf car assets are needed to bring in income to the operation.

Figure 11:
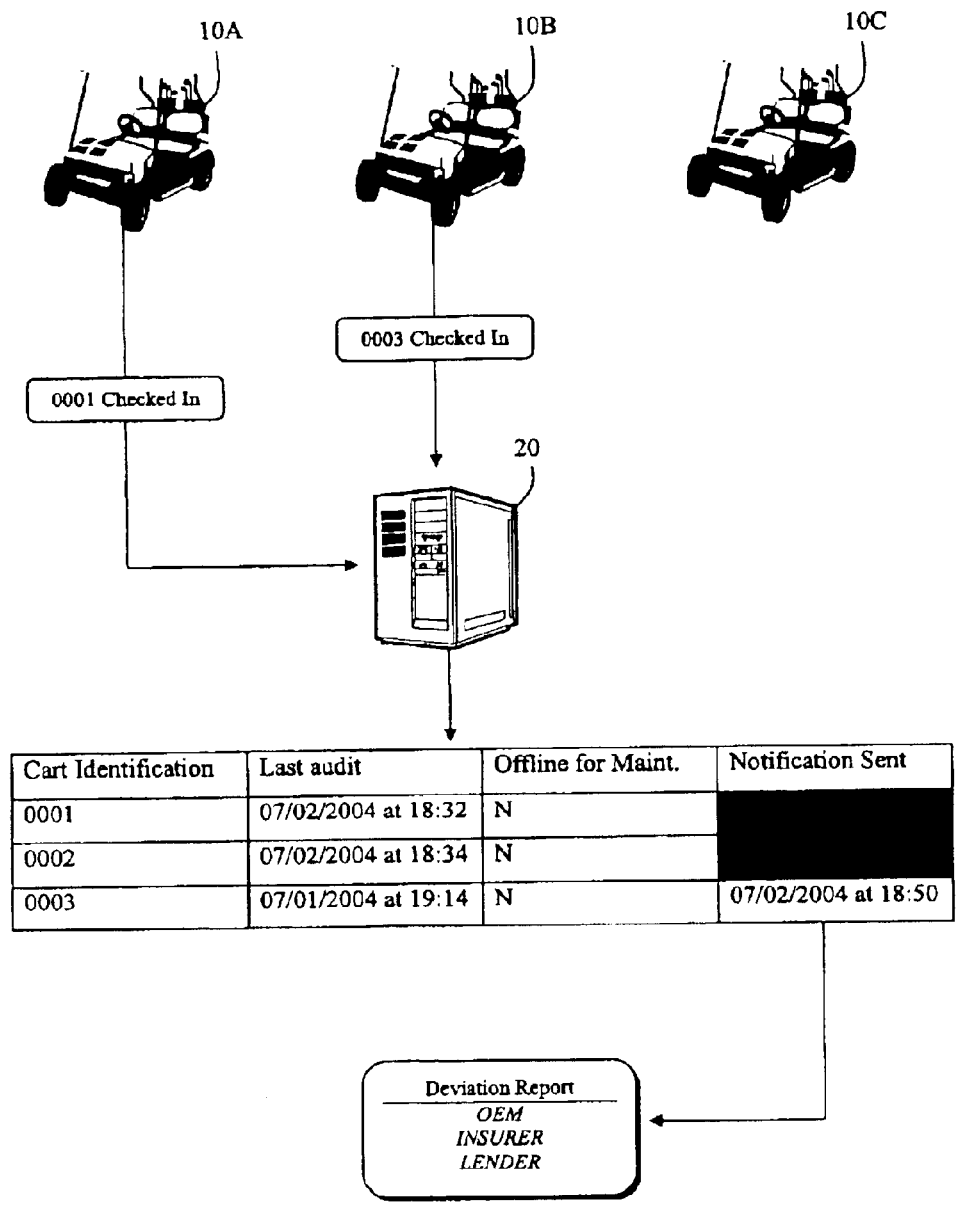
FIG. 11 is a diagrammatic view of an embodiment of the invention that monitors golf car inventory and notifies entities with a security interest if a discrepancy exists.

In FIG. 11, carts 10A–B transmit data received by data store 20. However, due to malfunction, misuse of theft, cart 10C does not transmit data. In a preferred embodiment of the invention, data store 20 maintains audit records to determine if an asset is potentially missing and communicates the information to operations manager, the OEM, insurer or lender of the asset.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

Is also to be understood that the following claims are intended to cover all of the generic and specific features of the invention herein described, and all statements of the scope of the invention which, as a matter of language, might be said to fall therebetween. Now that the invention has been described.

What is claimed is:

1. A method for optimizing golf car usage comprising the steps of:

recording golf car usage record based on axle revolution;

associating a golf car identification with the usage record;

communicating the usage record and associated identification to a data store;

calculating total usage data for each golf car identification; and reporting total usage data;

calculating golf car rental income data for a predetermined time frame;

calculating golf car usage data for the predetermined time frame; and comparing rental income data with usage data whereby discrepancies between actual use and rental records may be resolved.

2. The method of claim 1 further comprising the steps of: providing a software conduit for exporting golf car rental income data to the data store from an accounting application.

3. The method of claim 1 further comprising the steps of providing a software conduit for importing golf car usage data from the data store to an accounting application.

4. The method of claim 1 further comprising the step of calculating a usage-income efficiency value based on the step of comparing rental income data with usage data.

5. The method of claim 4 further comprising the steps of identifying at least one or more employees responsible for collecting golf car rental income and grouping the usage-income efficiency value with the at least one or more employees.

6. The method of claim 4 further comprising the step of measuring the usage-income efficiency value of a first golf course operation against a second golf course operation to determine the relative profitability of each course in view of golf car usage.

7. A method for optimizing golf car usage comprising the steps of:

recording golf car usage record based on axle revolutions;

associating a golf car identification with the usage record;

communicating the usage record and associated identification to a data store;

calculating total usage data for each golf car identification; and reporting total usage data;

prioritizing the deployment of golf cars based on total usage data; and communicating a priority order by a visual indicator.

8. The method of claim 7 wherein the visual indicator comprises at least one light emitting diode.

9. The method of claim 7 wherein the visual indicator comprises a liquid crystal display.

10. The method of claim 9 wherein the liquid crystal display indicates deployment priority numerically.

11. The method of claim 9 wherein the liquid crystal display indicates deployment priority alphabetically.

12. The method of claim 9 wherein the liquid crystal display also indicates a battery capacity level.

13. The method of claim 9 wherein the liquid crystal display also indicates golf car position by global positioning satellite.

14. A method for optimizing golf car usage comprising the steps of:

recording golf car usage record based on axle revolutions;

associating a golf car identification with the usage record;

communicating the usage record and associated identification to a data store;

calculating total usage data for each golf car identification;

reporting total usage data grouping total usage data into operational units;

calculating a benchmark value across a plurality of operational units; and comparing usage data of au individual operational unit against the benchmark value to quantify the relative success of the individual operational unit.

15. The method of claim 14 further comprising the step of modifying marketing programs responsive to the comparison.

16. The method of claim 14 further comprising the step of modifying personnel scheduling responsive to the comparison.

17. The method of claim 14 further comprising the step of modifying maintenance programs responsive to the comparison.

18. The method of claim 14 further comprising the steps of concealing the identity of the other operational units from the individual operation unit under comparison to encourage participation of a plurality of operational units without concern that competitive data might be disseminated.

19. A method for optimizing golf car usage comprising the steps of:

recording golf car usage record based on axle revolutions;

associating a golf car identification with the usage record;

communicating the usage record and associated identification to a data store;

calculating total usage data for each golf car identification;

reporting total usage data;

collecting golf car battery level data concurrently with usage data;

correlating battery level data and usage data; and evaluating battery performance based on usage data.

20. The method of claim 19 further comprising the step of associating product warranty data with battery performance to verify product warranty claims.

21. The method of claim 19 further comprising the step of scheduling preemptive maintenance responsive to poor battery performance.

22. The method of claim 19 further comprising the step of transmitting battery performance to original battery manufacturers.

23. The method of claim 19 further comprising the steps of:

scheduling maintenance procedures based on usage data.

24. The method of claim 23 further comprising the step of optimizing staffing schedules coincident with the scheduled maintenance procedures.

25. The method of claim 23 further comprising the step of optimizing the scheduled maintenance procedures coincident with low equipment demand periods.

26. The method of claim 19 further comprising the step of confirming golf car inventory based on the golf car identification.

27. The method of claim 26 further comprising the steps of established a predetermined inventory value and reporting a deviation of the value in the confirmation step.

28. The method of claim 26 further comprising the step of reporting the confirmation to an original equipment manufacturer having a security interest in the golf cars.

29. The method of claim 26 further comprising the step of reporting the confirmation to an insurer having a security interest in the golf cars.

30. The method of claim 26 further comprising the step of reporting the confirmation to a lender having a security interest in the golf cars.

* * * * *